May 3, 1955   G. W. MAGILL   2,707,601
TANDEM ROTOR HELICOPTER AND METHOD OF OPERATION
Filed Sept. 24, 1948   2 Sheets-Sheet 1

INVENTOR.
GILBERT W. MAGILL
BY
Lynn Latta
— ATTORNEY —

May 3, 1955     G. W. MAGILL     2,707,601
TANDEM ROTOR HELICOPTER AND METHOD OF OPERATION
Filed Sept. 24, 1948     2 Sheets-Sheet 2

INVENTOR.
GILBERT W. MAGILL
BY
*Lynn Latta*
- ATTORNEY -

United States Patent Office 2,707,601
Patented May 3, 1955

2,707,601

TANDEM ROTOR HELICOPTER AND METHOD OF OPERATION

Gilbert W. Magill, Glendale, Calif.

Application September 24, 1948, Serial No. 51,087

12 Claims. (Cl. 244—17.23)

This invention relates to aircraft having rotating sustaining rotors arranged in tandem, i. e. in fore and aft spacing. The present application is in part a continuation of my earlier application filed October 8, 1943, Serial No. 505,564, allowed March 29, 1948, now abandoned.

The basic objective of my invention is to provide inherent stability in an aircraft of the rotating sustaining rotor, or helicopter type. The problem of obtaining stability has proven to be an extremely difficult one in the helicopter art and has received perhaps more attention than any other single problem in that art. In the type of helicopter that is most commonly known at present, an attempt is made to attain stability by employing a laterally acting propeller or torque rotor at the tip of the fuselage tail, to counteract the counterthrust of a single sustaining rotor. As is well known, however, such helicopters do not have inherent stability. On the contrary, the pilot is required to constantly exercise the controls in order to keep the aircraft on its course, and the task is a very fatiguing one. Other efforts that have been made to achieve stability include the use of counterrotating sustaining rotors on a common axis, and the use of laterally spaced dual sustaining rotors. The coaxial type embodies difficult engineering problems in mounting two rotors for rotation on a single axis in opposite directions, and the laterally spaced arrangement has a number of objections including the fact that the framework supporting these rotors is heavy and air resistant. The tandem arrangement has the advantage of lending itself to a design of maximum streamlining. However, prior to my invention, so far as I am aware all efforts to fly a tandem type helicopter were unsuccessful, and those skilled in the art did not know how to achieve successful flight in a tandem type helicopter.

The present invention involves not only the discovery of how to achieve successful flight of a tandem type helicopter, but also the discovery that it is possible to achieve inherently stable flight in such a helicopter.

It has previously been believed that one of the essentials to stable flight was to provide hinged connections between the blades and the hub of a rotor so as to provide for a limited amount of relative vertical movement between blades and hub and thereby permit a variation in the coning angle of the rotor, in flight. This provided a certain amount of flexibility which permitted a helicopter to better adjust itself to the effects of gusts and other sudden air current changes. In the present invention I have found it possible to eliminate the necessity for the vertical hinging of the blades, and to use what may be loosely designated a "rigid" type of rotor, although it is to be understood that the invention contemplates the possibility of mounting the blades in their hubs for rotation about substantially their own longitudinal axes so as to provide for pitch adjustment. Such pitch adjustment, accomplished during flight, for the purpose of controlling the movements of the helicopter, is naturally contemplated, but since this feature in itself is not new in the art, no attempt has been made to illustrate it herein. It will be understood however, that, in fact, one of the advantages of the invention is that it greatly facilitates the construction of a rotor with adjustable pitch blades, by eliminating the necessity for vertical hinging movement of the blades. A further object of my invention is, therefore, to provide a helicopter of a rigid rotor type, capable of stable flight.

A further object is to provide a helicopter capable of higher forward speed than is possible in known conventional helicopters.

Broadly speaking, my invention involves the discovery that by properly locating the center of gravity of a helicopter in a normally loaded condition (or to state it somewhat differently, by designing and arranging the components of the craft so that, when normally loaded, it will have its center of gravity properly located) it is possible to achieve not only successful flight but also inherently stable flight such as to require a minimum of control effort on the part of the pilot. The primary principle involved in the invention is that of locating the center of gravity considerably farther forward than the position which would logically seem to be the proper position for the center of gravity.

It might be expected that, in a tandem rotor aircraft having two rotors the same size, both rotating at the same speed and having the same blade angle, the center of gravity of the machine should be at the midpoint of the space between the two rotors so that each rotor would carry its half of the total weight. This, however, is not the case. Extensive experimental tests with preflight and wind tunnel models, as well as the full-sized operating helicopter, have shown that such a machine would be extremely unstable in any type of powered flight. Flying models, constructed and balanced in this manner, when launched with forward speed, immediately nose up, slide back and fall, out of control. When launched without forward speed or with little forward speed they pitch to one side then swing back to the opposite side and repeat this pendulating until completely out of control. When the center of gravity is moved forward the instability becomes less and finally ceases completely when the center of gravity reaches in the neighborhood of 25% to 30% of the distance from the front rotor axis to the rear rotor axis. The aircraft is now stable about all three stability axes.

Other objects will become apparent in the ensuing specifications and appended drawings in which.

The principles of the invention are applicable where the rotors are sufficiently closely spaced to cause the slipstream of the front rotor to affect the operation of the rear rotor. This condition exists especially where the rotational paths of the rotors are in overlapping relation, although it may also exist to a lesser extent where the rotational paths are separated. For normal design purposes however, it is preferable to have the rotors sufficiently closely spaced so that actual overlapping exists.

Figure 3:
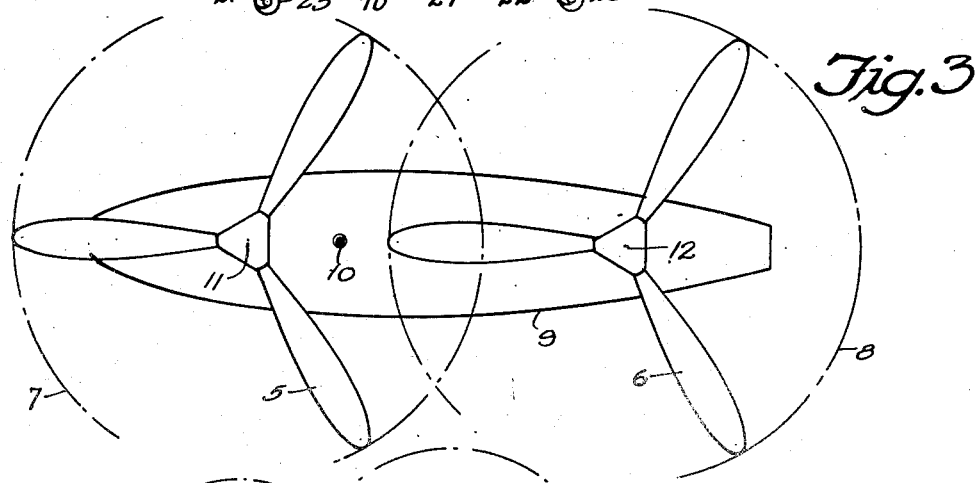
Fig. 3 is a plan view of a modified form of the invention.

Referring now to the drawings, I have shown in Fig. 3 a helicopter having front and rear rotors 5 and 6 respectively, of equal diameters. The tip trajectories 7 and 8 respectively of these rotors are preferably in intersecting relation as indicated. The rotors 5 and 6 are arranged in tandem relation with reference to a fuselage 9 which is supported by them. The center of gravity is indicated at 10, at a point rearwardly of the front rotor axis 11 a distance approximately one fourth of the distance from the front rotor axis 11 to the rear rotor axis 12.

As stated above, the invention involves the primary principle of locating the center of gravity considerably forwardly of the point where normally it would be expected it should be placed. The invention involves the second principle that the degree of displacement of the center of gravity is affected by the ratio between the diameters of the rotors. As the diameter of the rear rotor is increased, the location of the center of gravity, in order to attain maximum stability, is shifted rearwardly.

The invention involves the further principle that the front rotor must not be larger than the rear rotor, for the reason that in normal forward flight the front rotor, in proportion to its diameter, develops a higher effective lifting thrust than the rear rotor (assuming other essential factors of thrust, such as blade pitch, to be the same) and a correspondingly higher counter torque is developed. The counter torque of the rear rotor opposes the counter torque of the front rotor (to this end, the rotors are arranged to rotate in opposite directions) but if the value of the counter torque of the front rotor is excessively higher than the torque of the rear rotor, it will tend to rotate the craft about the axis of the front rotor. A further principle of the invention is that the rear rotor may and preferably should be larger than the front rotor, in order to reduce the differential between the counter torque of the front rotor and that of the rear rotor. For the same reason of avoiding excessive differential between the counter torques of the two rotors, the diameter of the rear rotor should not exceed that of the front rotor by more than a ratio of front rotor diameter to rear rotor diameter of 0.7. The optimum condition is one in which the two counter torques are equal and balanced against each other, and this condition will ordinarily be attained where the ratio between diameters of front and rear rotors respectively is approximately 9 to 10 and in which the center of gravity is located at a point rearwardly of the front rotor axis approximately 35% of the distance between the two axes. This arrangement provides the optimum advantages of balancing the counter torque and locating the center of gravity as nearly as possible to the center of the craft so as to make available a greater percentage of the overall length of the fuselage for useful loading.

To go beyond the above indicated limits of possible ratios of rotor diameters would require an undesirable lateral tilting of the rotor axes in opposite directions to counteract the torque differential or would require the addition of a torque rotor at one end or the other of the craft, and the use of a torque rotor is undesirable because it detracts from the streamlining and power of the craft.

In the helicopter shown in Fig. 3, the rotor axes are parallel. When the forward rotor axis is vertical and the rear rotor axis is inclined forwardly from the vertical, the center of gravity must be located further forward which makes the machine even more stable. When the forward rotor axis is inclined forwardly and the rear rotor axis is vertical, the center of gravity should be moved further back but the helicopter becomes less stable. It appears that parallel axes or nearly parallel axes are most satisfactory.

Figure 1:
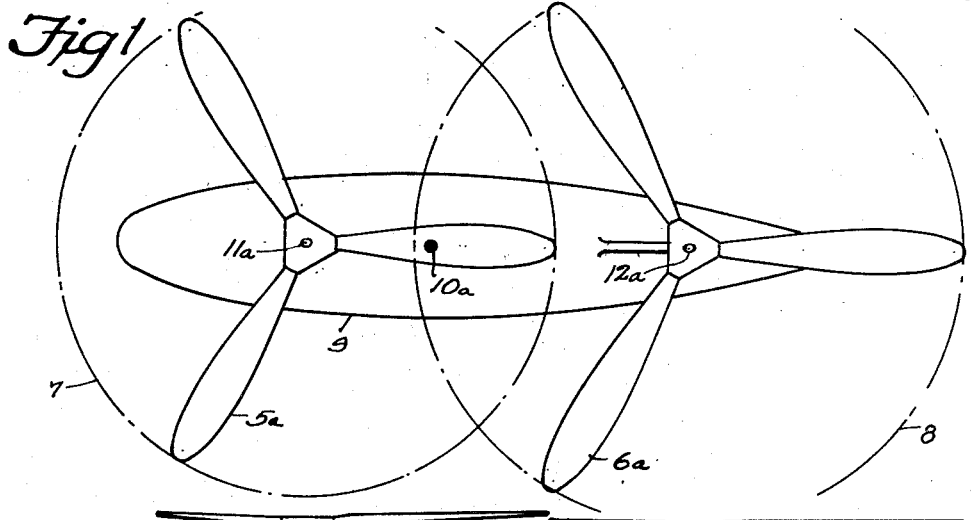
Fig. 1 is a plan view of a helicopter embodying a preferred form of the invention.
Figure 2:
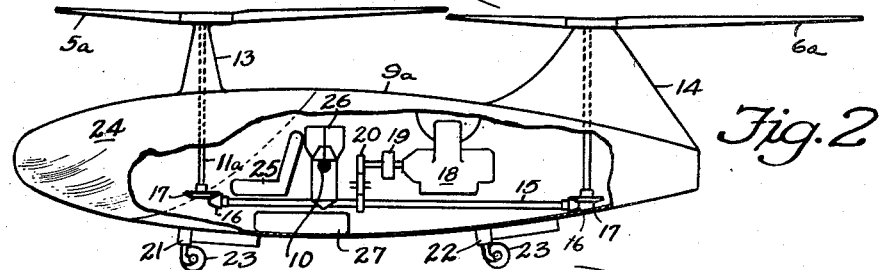
Fig. 2 is a side view of the same, with a portion of the fuselage broken away to illustrate interior construction.

Figs. 1 and 2 illustrate a preferred form of the invention in which optimum advantages may be secured. In this case, the front rotor 5a has a diameter approximately 90% of the rear rotor 6a. The center of gravity, indicated at 10a is located at a point rearwardly of the front rotor axis a distance of about 35% of the distance between the rotor axes. The various components of the aircraft structure are so located and arranged that the center of gravity will be thus located when the helicopter is normally loaded.

There is an approximately determinable relationship between the ratio of forward to rear rotor diameters on the one hand and the position of the center of gravity on the other hand. Using the symbol R to denote the ratio of the forward rotor diameter to the rear rotor diameter, and using the symbol $r$ to indicate the ratio between the distance from the forward rotor axis to the center of gravity and the distance between the two rotor axes, the following are approximately the relationships existing for several selected values of these ratios:

(a) Where R is unity, $r$ is about .25
(b) Where R is .9, $r$ is about .35
(c) Where R is .8, $r$ is about .45

From these values can be derived an approximate rule for determining the shift of the center of gravity as the ratio of rotor diameters is varied, as follows:

$$r = 1.25 - R$$

From the foregoing it will be apparent that as the ratio becomes smaller, between forward and rear rotor diameters, the center of gravity moves aft, as would be expected. Where the ratio between rotors becomes as low as 75%, the position of the center of gravity moves close to the midpoint between rotor axes, but a ratio this low is undesirable for the reason, stated above, that the torque differential in favor of the rear rotor becomes undesirably excessive.

The above described characteristics obtain when the helicopter is in normal forward flight, at a normal cruising speed, with both rotors operating at the same speed and blade pitch. As the forward speed decreases below normal cruising speed, however, it becomes necessary to increase the blade angle of the forward rotor over that of the rear rotor, in order to avoid nosing down, since the effective lifting thrusts of the rotors tend to equalize as forward speed approaches zero.

Figure 4:
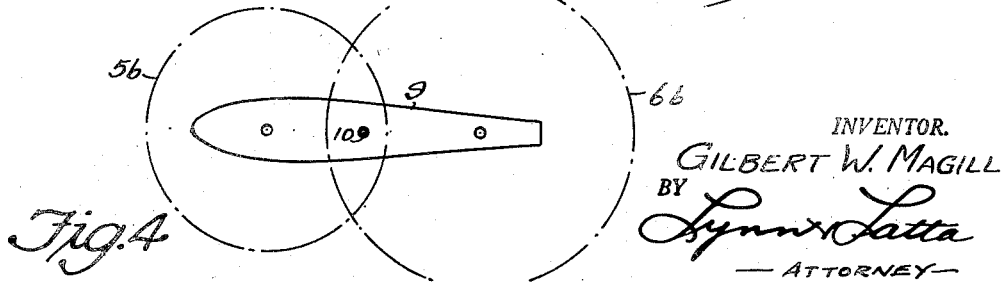
Fig. 4 is a schematic plan view of another modified form of the invention.

Fig. 4 illustrates, schematically, a helicopter having a front rotor 5b the diameter of which is .8 of that of the rear rotor 6b (corresponding to Example c above).

The shaft 11a extends upwardly through a pylon 13 near the nose of the fuselage 9a, and the rear rotor shaft 12a extends upwardly through a vertical stabilizer fin 14 at the rear end of the fuselage 9a. Power may be transmitted through the shafts 11a and 12a from a common drive shaft 15 and bevel pinion and gear sets 16, 17. The shaft 15 receives power from an engine 18 through a clutch 19 and a train of gears 20. The clutch 19 is preferably of the overriding type which automatically disengages if the gear train 20 rotates faster than the engine 18. This permits the rotors to spin by autorotation without dragging the engine in the event of power failure.

I prefer to use completely retractable landing gear units including two front units 21 and a rear unit 22 each of long vertical travel and having wheels 23, all of which are fully castering for ease in landing and ground handling.

The fuselage 9 should be an elongated body of streamlined form preferably of elliptical or circular cross section. The cockpit portion 24, from the pilot seat 25 forwardly, is preferably made of a transparent sheet material, and thereby there is provided better vision than is possible in any conventional type of aircraft. The rotors spin rapidly enough so as not to interfere with clear vision through them.

Regarding the general arrangement of the aircraft, it will ordinarily be operated by a two man, side by side crew whose combined weight will approximately equal a present day 150 or 175 horse power air cooled engine. As is clearly shown in Fig. 2, the crew's seats 25 are disposed aft of but near the forward rotor shaft 11a, the tank 27 is disposed in a plane below the seats 25, and the engine 18 is located rearwardly of said seats and nearest to the aft rotor 12a, with the overall center of gravity 10a located in the area between said seats and engine. Consequently, the crew's seats 25, the engine 18, etc. will be so disposed with reference to the remainder of the aircraft as to cause the center of gravity to be disposed at the correct location. However, sufficient space is left in the general area where the center of gravity is to be located so that the variable load, such as cargo, passengers, bombs or depth charges 26, may be stowed. In the alternative, two additional seats may be installed in this space, for the transportation of personnel, instead of the bomb load. Another part of the variable load is the fuel, for which I prefer to provide storage space in the form of the long thin tank 27 located under the drive shaft 15 and in the general area of the variable load space.

Figure 5:
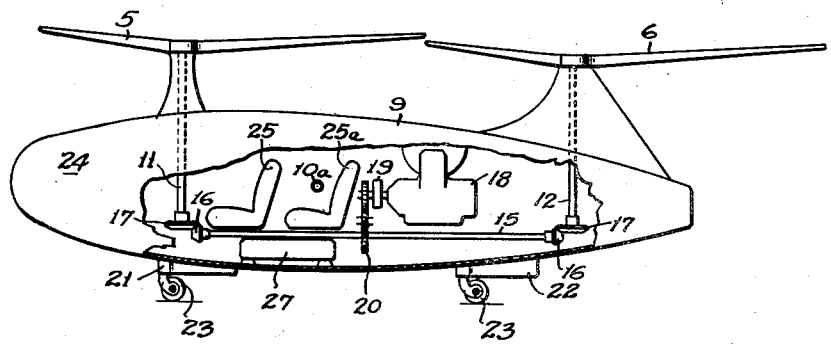
Fig. 5 is a side view of another modified form of the invention, with portions of the helicopter fuselage broken away to better illustrate the internal components thereof.

Fig. 5 illustrates the alternative arrangement referred to above, the additional seats being indicated at 25a and being located in the same position as the bomb load of Fig. 2. The disposition of the components of the aircraft, including the pilot's seat 25 and the passengers' seats 25a, is such as to locate the center of gravity 10a at the proper position, as described above, to attain stability in the aircraft.

The proper location of the center of gravity can be designed into the aircraft by locating and arranging the components of the aircraft, including not only the fuselage, landing gear, rotors, rotor pylons, and drive transmitting shafting and gearing, but also the engine, the fuel tank, the seats for the crew, and the seats for passengers or additional personnel (or in the alternative, a space for a bomb load and conventional bomb hangers); and that such predetermined location can be easily maintained through any normal loading of the aircraft.

It will be apparent that the space for variable cargo (represented at 26 in Fig. 2 by the symbol for a bomb load) has a fore-aft location immediately adjacent that of the center of gravity which is indicated by the small circle 10 in the center of bomb symbol 26, whereby the variable cargo which is loaded into this space will necessarily be positioned substantially at the center of gravity, if loaded evenly. Thus, obviously, the weight of the variable cargo may vary widely without materially changing the location of the center of gravity.

It will also be obvious that the aforesaid space for variable cargo, the crew seats 25, and the fuel tank 27, as shown in Fig. 2, are grouped immediately adjacent the selected location for the center of gravity as indicated by the small circle 10, and that such grouping may be utilized to minimize any displacement of the center of gravity from the selected preferred location, arising from loading and unloading the helicopter, thus attaining the previously stated object of designing and arranging the components of the aircraft so that, when normally loaded, it will have its center of gravity properly located.

The term "components," as used herein, is to be construed as meaning permanent parts of the aircraft itself as distinguished from cargo, crew, etc. The term "load" as used herein, means any person, such as the pilot and passengers, or any object, such as cargo, special equipment, etc., whose weight would affect the total weight of and the location of the center of gravity of the aircraft, and the term "loading," as used herein, means the disposition of such person or object relative to the aircraft so as to add to the overall weight of the aircraft.

The drive shaft 15 has a triple function. It transmits power from the engine to the rotor shafts. It synchronizes the rotors so that their blades mesh in the most advantageous mechanical and aerodynamic relationship. It also acts as an inter-rotor power transmitter in case of engine failure. That is to say, when the power is shut off and a vertical or a nearly vertical descent is required, the front rotor, in supporting most of the machine's weight, has to operate at a higher blade angle that that at which it would normally autorotate. The rear rotor, in supporting considerably less weight at a lower blade angle, has an excess of autorotative force which is transmitted through the drive shaft 15 to the front rotor to make the continued autorotation of the front rotor possible.

A reasonable forward inclination of the rotor axes provides a more streamlined air flow over the fuselage and permits the use of right angle drive gears 16, 17 which can be interchangeable in the forward and rear gear set. An approximately 5° inclination permits both rotors to rotate in the same plane without making the stabilizer fin 14 unnecessarily high or the pylon 13 low enough to cause a disturbing aerodynamic influence between the forward rotor and the top of the fuselage, which would happen if the angle were excessive. Hence both rotor shafts 1 and 2 can be the same length, and, with special design they can be interchangeable.

I prefer to use 3-bladed rotors. The blades are of airfoil cross section and are of the flat type, that is without chord plane twist, so that all portions of the blade at any radius will have the same angle of inclination with respect to the plane of rotation of the rotor. They are also preferably of a symmetrical airfoil section, i. e., a section having the same convex curvature on both the upper and lower faces thereof, thus providing a symmetrical shape about the chord plane of the air foil. I prefer to employ a symmetrical air foil of the highest speed laminar flow type. The blades all have identical root ends or shanks where they fit into the hub 12a and 11a. Hence they can be used with either face of the blade facing upwardly and, in the case of a craft having rotors of equal size, can be used interchangeably in both rotors.

Aerodynamically, a flat type or untwisted blade has a good all around efficiency. Ordinarily, it is considered necessary to provide a power-driven rotor or a helicopter rotor with a twist opposite to that of an auto-rotating blade or autogyro. The flat type blade may be regarded as a compromise or medium between the two extremes. Furthermore, a twisted blade, though admittedly superior for vertical flight, is definitely inferior for forward flight as the high pitch part of the blade near the hub offers increased resistance, out of proportion to its increase in lift. Since the aircraft will fly forwardly a much greater proportion of the time than upwardly, the optimum design for forward flight is preferred.

I also prefer to mount the blades with their tips slightly higher than the hub, so that the plane of rotation is a shallow cone instead of a flat disc. This angle of inclination is called the "coning angle." It corresponds to the dihedral angle in an airplane and contributes to the stability and reduces the stresses on the blades. The center of the rotor may be regarded as the intersection of the rotor axis with the plane of rotation.

I find it advantageous to have the rotor discs intersect or overlap each other. By intersecting, I mean that both rotors rotate in the same surface plane. By overlapping is meant rotation of one rotor in a plane above that of the other rotor, and with the path of rotation of blade tips of the upper rotor crossing above that of the lower rotor. I prefer to have the rotors intersect to about ½ their radius. This allows a safe margin of mechanical and aerodynamic clearance. The intersecting or overlapping design produces a more compact, lighter weight and more efficient rotor plane. For example, in designing a rotor plane, an estimate of the gross weight is made. Then the diameters of the rotors required for safely lowering the machine with power off is determined. If the rotors are spaced far enough apart so that they do not overlap, then the space within the fuselage is usually larger than is required to carry the load which the rotors can safely lower. This is particularly true in small craft where the height and width of the fuselage are of such dimensions as to comfortably house the passagers in a seated position. However, if the rotor axes are brought closer together with a consequent intersecting or overlapping of the rotor discs, then the drive shaft 15 may be made shorter, the unnecessary space within the fuselage is reduced and a consequent saving of material is effected, resulting in a lighter weight, better performing and easier to store aircraft which can take off and land in a smaller space.

The rotor plane shown in the drawings is intended for military purposes, such as operating from the deck of a ship to sight and sink submarines or for observation and photographic missions.

In the claims, I have used the term "rated static thrust" to designate the individual thrust rating or capacity of a respective rotor, as derived from all of its characteristics (such as diameter, blade area, shape and pitch) when operated independently at a given speed comparable to that of normal flight. For example, to illustrate, let $N_1$ and $\alpha_1$ designate the R. P. M. and average angle of blade incidence respectively, of one of the rotors during normal cruising flight of the helicopter. Then, for the purposes of this specification, the rated static thrust of this rotor is defined as the thrust that the rotor would produce on a stationary test stand, away from extraneous influences such as the slipstream of a neighboring rotor, and operating at a rotational speed of $N_1$ and with a blade pitch setting of $\alpha_1$. The rated static thrust, as here defined, is seen to be a perfectly definite characteristic associated with a given rotor and depending only on the geometrical properties of the rotor and on its rated R. P. M. and blade pitch setting for normal cruising flight.

As a specific example, two parallel axis rotors of equal diameter, blade pitch and area, operational speed, etc., would have equal rated static thrusts, although having unequal effective thrusts producing some counter torque differential, when operating in tandem in forward flight, as hereinbefore specified.

For the purpose of brevity, the claims herein define the fore-aft location of the center of gravity in terms of distances between the rotor hub-centers. This terminology refers to the position as measured in a fore-aft direction along a straight line intersecting the hub-centers, at a point on a line intersecting such straight line at right angles thereto and passing through the center of gravity (which is located at a level below the rotors and therefore below such straight line joining the hub-centers). The hub centers are to be understood as the points of substantial intersection of the individual longitudinal axes of the blades.

I claim:

1. A rotary wing aircraft comprising components including a body and two lift rotors arranged in tandem for rotation on approximately parallel axes, the rated static thrust of the forward rotor being of a magnitude not greater than that of the aft rotor, said body having space for variable load, and the components being so arranged as to establish a predetermined location for the center of gravity of said aircraft forwardly of the midpoint between the hub centers of said rotors, below the line connecting said hub centers, and within the area of said variable load space, whereby the actual center of gravity of the aircraft under normal distribution of the variable load will remain forwardly of said midpoint.

2. A rotary wing aircraft comprising components including a body and two lift rotors arranged in tandem for rotation on approximately parallel axes and with substantially intersecting tip trajectories, the rated static thrust of the forward rotor being of a magnitude not greater than that of the aft rotor, the components being so arranged as to determine a location for the center of gravity of said aircraft forwardly of the midpoint between the hub centers of said rotors and below the line connecting said hub centers, said body having space for variable load, located in the area of the aforesaid location of the center of gravity, and the center of gravity of the aircraft under normal distribution of the variable load remaining forwardly of said midpoint.

3. A rotary wing aircraft comprising components including a body, two lift rotors connected to said body and arranged in tandem for rotation on approximately parallel axes, crew's seats in said body, a fuel tank attached to said body, and means providing motive power for rotating said rotors; the rated static thrust of the forward rotor being of a magnitude not greater than that of the aft rotor, said body having space for variable load in addition to the contents of said fuel tank and the occupants of said seats; and said components being so arranged as to determine a location for the center of gravity of said aircraft forwardly of the midpoint between the hub centers of said rotors, below the line connecting said hub centers, and within the area of said variable load space, for any normal distribution of the variable load.

4. A rotary wing aircraft comprising a body having space for variable load, two lift rotors connected to said body and arranged in tandem for rotation on approximately parallel axes, crew's seats in said body, a fuel tank attached to said body, means providing motive power for rotating said rotors, and drive connections between said motive power means and said rotors; the rated static thrust of the forward rotor being of a magnitude not greater than that of the aft rotor, said engine, fuel tank, variable load space and seats being grouped together in an area located intermediate the ends of said body, in such a manner that the center of gravity of said aircraft will fall within said area, and so spaced from the rotor axes as to determine for said center of gravity a location forwardly of the midpoint between the hub centers of said rotors and below the line connecting said hub centers, for any normal distribution of the variable load of the aircraft.

5. A rotary wing aircraft as defined in claim 4, wherein said body has a space for variable load, said space being located so that the said center of gravity will be substantially centered with reference to said space, whereby the location of said center of gravity will remain substantially unaffected by changes in the amount and weight of the variable loads in said space.

6. A rotary wing aircraft comprising a body, two lift rotors connected to said body and arranged in tandem for rotation on approximately parallel axes, crew's seats in said body, a fuel tank attached to said body, and means providing motive power for rotating said rotors; the rated static thrust of the forward rotor being of a magnitude not greater than that of the aft rotor; said fuel tank, engine and seats being so disposed with reference to the remainder of the aircraft as to determine a location for the center of gravity forwardly of the midpoint between the hub centers of said rotors and below the line connecting said hub centers when the seats are occupied by the crew; and said body having a space for variable load, said space being disposed immediately adjacent the location of said determined center of gravity, whereby the actual location of the center of gravity will remain substantially at said determined location for any normal loading of said variable load space.

7. A rotary wing aircraft, comprising: a body, a forward rotor and an aft rotor connected to said body and arranged in tandem for rotation on approximately parallel axes, crew's seats in said body disposed between the axes of said rotors and near the axis of said forward rotor, a fuel tank attached to said body and disposed in the vicinity of said crew's seats, engine means disposed rearwardly of said crew's seats and near the axis of said aft rotor providing motive power for rotating said rotors, connections between said rotors and engine means for driving said rotors in synchronism, said body having storage space for variable load disposed intermediate said crew's seats and said engine means and including at least a portion disposed forwardly of the midpoint between the axes of said rotors, the rated thrust of the forward rotor being of a magnitude not greater than that of the aft rotor, said fuel tank, engine means, storage space and seats being so disposed with reference to the remainder of the aircraft as to determine the location for the center of gravity of the aircraft within said body forwardly of the midpoint between the axes of said rotors and in said storage space, whereby the actual location of the center of gravity will remain substantially at the specified location for any normal loading of said variable load space.

8. A method of operating a rotary wing aircraft having components including a fuselage provided with a storage space for a variable load, a forward rotor and an aft rotor connected to said fuselage and arranged in tandem for rotation on approximately parallel axes, and means for driving the rotors in synchronism, the rated thrust of the forward rotor being of a magnitude not greater than that of the aft rotor, comprising the steps of: locating the variable load in the fuselage with regard to the remaining components of the aircraft so that the overall center of gravity of the aircraft as loaded will be disposed forwardly of a midpoint between the axes of the rotors to produce stability in forward flight; and driving the rotors of the aircraft to produce propulsion forces on the aircraft causing said aircraft to travel forwardly approximately horizontally in the general direction of the longitudinal axis of the fuselage.

9. A method of operating a rotary wing aircraft as defined in claim 8, characterized by locating the variable load to position the overall center of gravity of the aircraft at a point approximately 25% to 45% of the distance from the axis of the forward rotor to the axis of the aft rotor.

10. A method of operating a rotary wing aircraft as defined in claim 8, in which the rated static thrust of the forward rotor is of a magnitude approximately 90% of that of the aft rotor and characterized by locating the variable load to position the overall center of gravity of the aircraft at a point approximately 35% of the distance from the axis of the forward rotor to the axis of the aft rotor.

11. A method of operating a rotary wing aircraft as defined in claim 8, in which the rated static thrust of the forward rotor is of a magnitude between 100% and 70% of that of the aft rotor and characterized by locating the variable load to position the overall center of gravity of the aircraft at a point approximately 25% to 45% of the distance from the axis of the forward rotor to the axis of the aft rotor.

12. A method of operating a rotary wing aircraft having components including a fuselage, a forward rotor and an aft rotor connected to said fuselage and arranged in tandem for rotation on approximately parallel axes, and means for driving the rotors in synchronism, the rated thrust of the forward rotor being of a magnitude not greater than that of the aft rotor, comprising the steps of: loading the fuselage so that the overall center of gravity of the aircraft as loaded will be disposed forwardly of a midpoint between the axes of the rotors to produce stability in forward flight; and driving the rotors of the aircraft to produce propulsion forces on the aircraft causing said aircraft to travel forwardly approximately horizontally in the general direction of the longitudinal axis of the fuselage.

References Cited in the file of this patent
UNITED STATES PATENTS 2,273,303    Waldron _____ Feb. 17, 1942